United States Patent
Chiu et al.

(10) Patent No.: US 7,055,159 B2
(45) Date of Patent: May 30, 2006

(54) DISC READING APPARATUS WITH A STRUCTURE FOR PREVENTING A CRACKED FROM JETTING OUT

(75) Inventors: Hsien-Tsung Chiu, Gueishan (TW); Yi-Ling Lee, Jhongli (TW)

(73) Assignee: BENQ Corporation, Taoyuan (TW)

( * ) Notice: Subject to any disclaimer, the term of this patent is extended or adjusted under 35 U.S.C. 154(b) by 103 days.

(21) Appl. No.: 10/638,727

(22) Filed: Aug. 11, 2003

(65) Prior Publication Data
US 2004/0032783 A1 Feb. 19, 2004

(30) Foreign Application Priority Data
Aug. 15, 2002 (TW) .............................. 91118395 A

(51) Int. Cl.
*G11B 33/02* (2006.01)
(52) U.S. Cl. ..................................... 720/646
(58) Field of Classification Search ................ 720/603, 720/646, 602, 601; 369/75.2; 360/97.01
See application file for complete search history.

(56) References Cited

U.S. PATENT DOCUMENTS

| | | | | |
|---|---|---|---|---|
| 5,978,339 A | * | 11/1999 | Sasaki et al. | 720/646 |
| 6,370,101 B1 | * | 4/2002 | Kim | 720/603 |
| 6,560,184 B1 | * | 5/2003 | Shida et al. | 720/603 |
| 6,650,609 B1 | * | 11/2003 | Omori et al. | 720/649 |
| 2002/0051418 A1 | * | 5/2002 | Takahashi et al. | 369/75.2 |
| 2004/0004785 A1 | * | 1/2004 | Seo | 360/97.01 |

* cited by examiner

*Primary Examiner*—William Korzuch
*Assistant Examiner*—Mark Blouin
(74) *Attorney, Agent, or Firm*—Snell & Wilmer L.L.P.

(57) ABSTRACT

A disc reading apparatus for preventing a cracked disc from jetting out is provided. The disc reading apparatus includes a disc tray and a housing. The disc tray includes a recess for receiving a disc, and the recess defines a recess flange. The housing includes an upper plate parallel to the disc tray, and the upper plate includes a barrier portion. The barrier portion further includes a plurality of bending boundaries and prevents a cracked disc from jetting out.

12 Claims, 5 Drawing Sheets

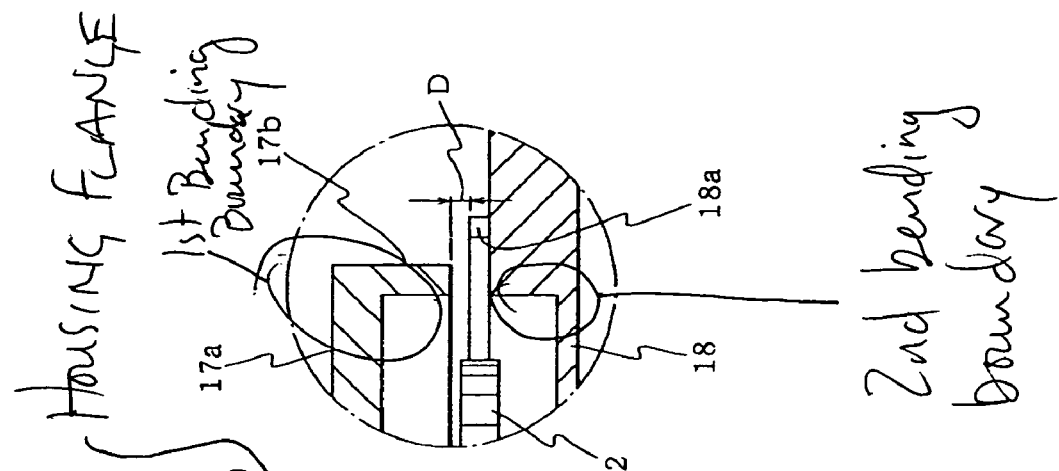
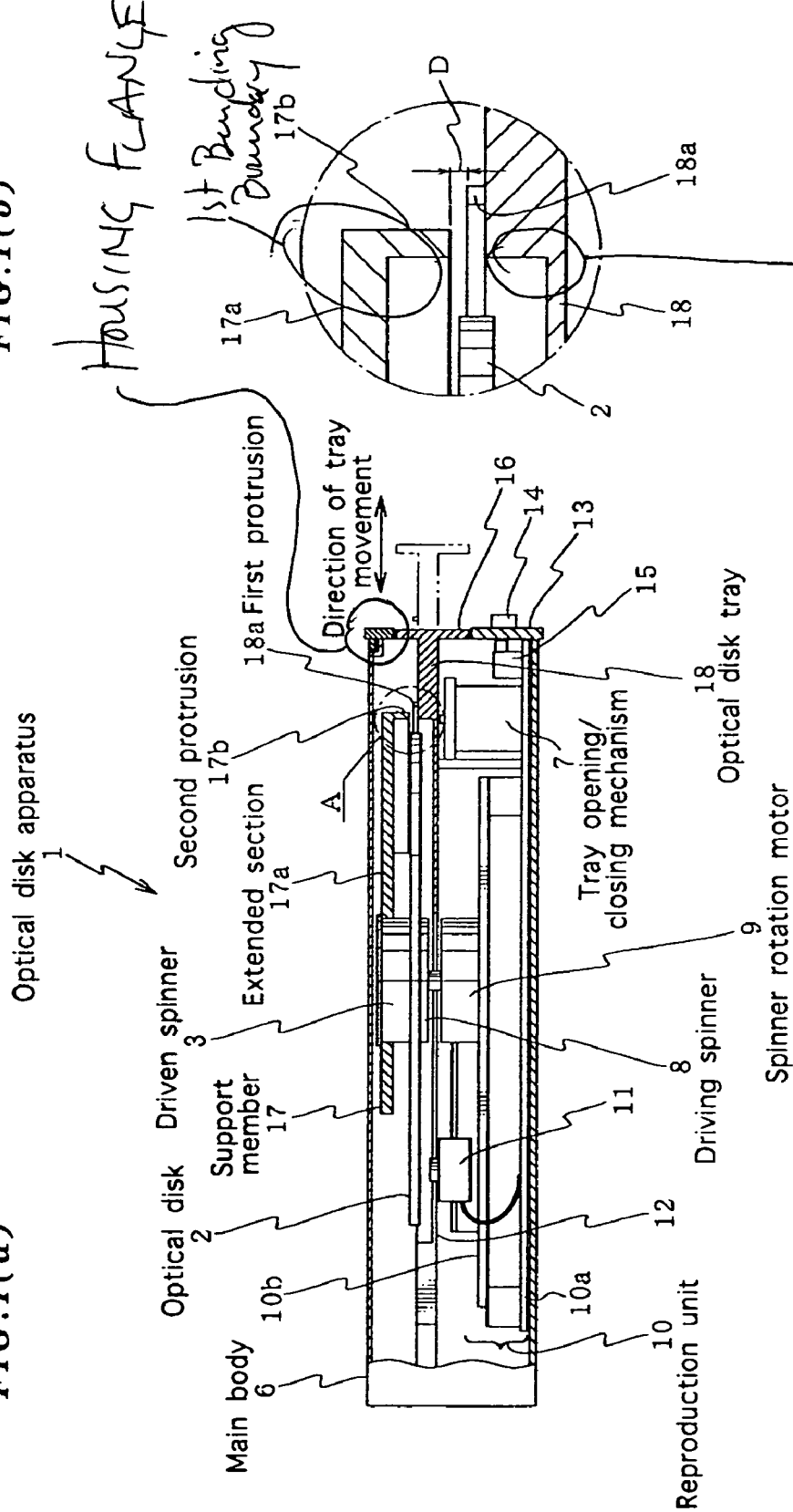

DISC READING APPARATUS WITH A STRUCTURE FOR PREVENTING A CRACKED FROM JETTING OUT

CROSS REFERENCE TO RELATED APPLICATIONS

This Application claims priority to Taiwan Patent Application No. 091118395 entitled "Disc Data Storage Apparatus with Structure for Preventing Crack Disc Being Jetted Out," filed Aug. 15, 2002.

FIELD OF INVENTION

The present invention relates to a disc reading apparatus for preventing a cracked disc from jetting out of the disc data reading apparatus.

BACKGROUND OF THE INVENTION

Due to the raise in rotation speed of CD-ROM drives and the uneven quality of discs on the market nowadays, injuries caused by cracked discs that jet out from the running CD-ROM drive happen from time to time. How to design a disc reading apparatus with a structure for preventing the cracked disc from jetting out has become an important issue.

FIGS. 1a and 1b are respectively a schematic and a cross-sectional diagram of a disc reading apparatus of prior art. Generally, a cracked disc passes through the slot between the disc tray 100 and upper plate 200 breaks the cover 720 of the faceplate 700 and injures people. A traditional design to prevent the cracked disc from jetting out is bending the upper plate flange 240 downward to form a barrier portion 260. The barrier portion 260 can block the out-going cracked discs because of the ample intensity of upper plate 200.

However, the barrier portion 260 is located at the edge of the upper plate 200. If a cracked disc jets out below the barrier portion 260, the faceplate 700 and cover 720 are not strong enough to obstruct the cracked disc. Besides, the energy caused by the cracking of the disc 140 squeezes the upper plate 200 upward to make way for the cracked disc to jet out the barrier portion 260 of the upper plate 200 and results in accidents.

SUMMARY OF THE INVENTION

One aspect of the present invention is to provide a disc reading apparatus for preventing a cracked disc or portions thereof from bursting out of the apparatus.

Another aspect of the present invention is to provide a disc reading apparatus that prevents the upper plate from deformation caused by disc cracking.

Yet another aspect of the present invention is to provide a disc reading apparatus that reduces the energy caused by disc cracking.

The disc reading apparatus of the present invention comprises a housing, a disc tray having a recess, and a recess flange. The housing includes an upper plate which is parallel to the disc tray and has a plurality of bending boundaries. When a disc cracks inside the disc reading apparatus, a barrier portion prevents the cracked disc from jetting out.

A slot exists between the barrier portion and the disc tray. If a cracked disc is not stopped, it gets into the slot and keeps moving out. Then the cracked disc suffers friction provided by the slot. Moreover, the barrier portion increases the anti-deflection intensity of the upper plate that helps to prevent the upper plate from deformation and decreases the probability of a cracked disc's jetting out.

BRIEF DESCRIPTION OF THE DRAWINGS

FIG. 1a shows a schematic diagram of a disc reading apparatus of prior art.

FIG. 1b shows a cross-sectional diagram of a disc reading apparatus of prior art.

DETAILED DESCRIPTION

Figure 2:
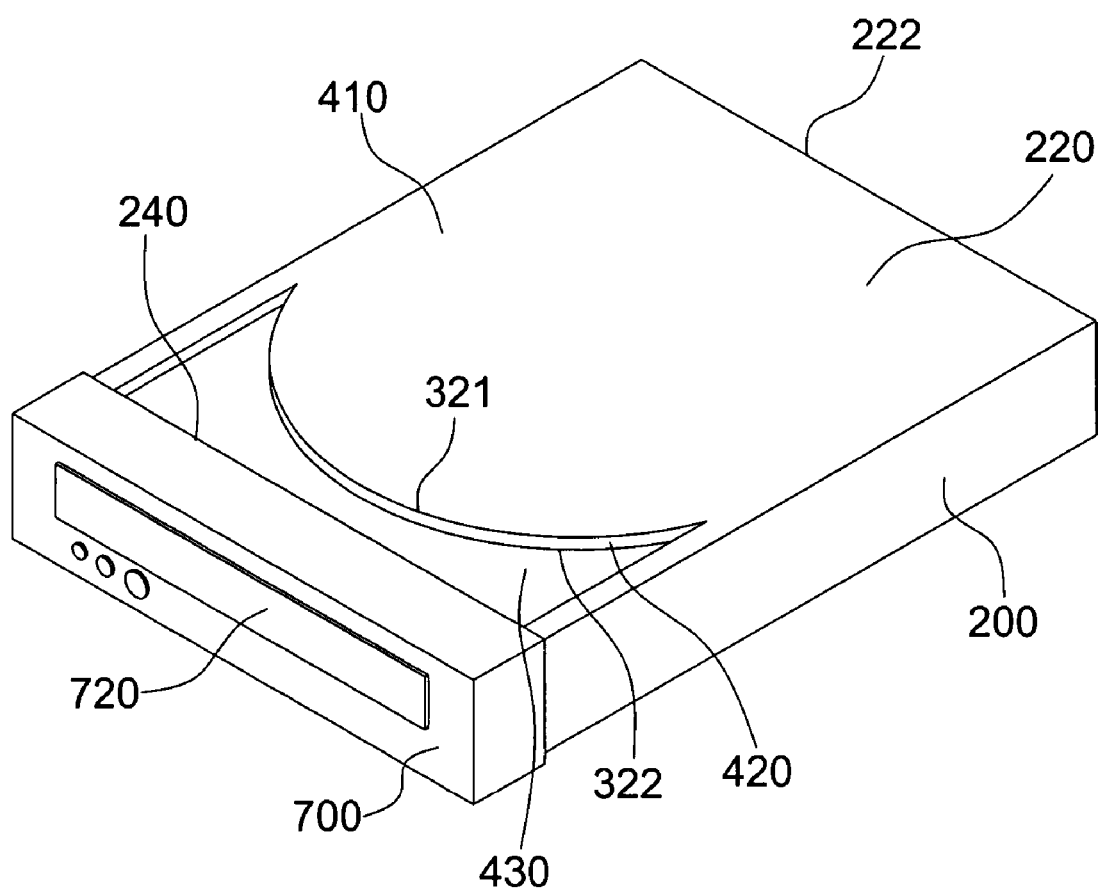
FIG. 2 shows a schematic diagram of a disc reading apparatus of the first embodiment of the present invention.

The present invention provides a disc reading apparatus, as shown in FIG. 2. When a disc in the disc reading apparatus cracks, the apparatus of the present invention prevents the cracked disc from jetting out. The disc reading apparatus here may be a CD-ROM drive, a CD-R drive, a DVD player or the like. Three preferred embodiments are described as follows.

THE FIRST EMBODIMENT

Figure 3:
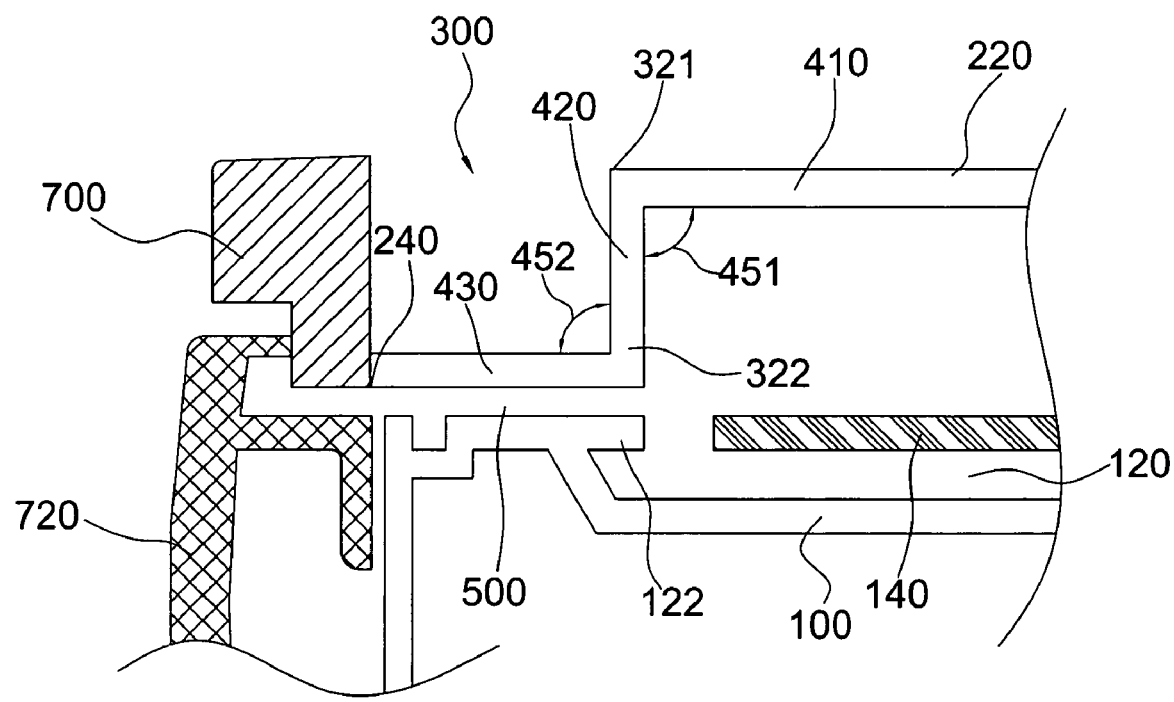
FIG. 3 shows a cross-sectional diagram of the embodiment in FIG. 2.

The disc reading apparatus of the present invention includes a disc tray 100 and a housing 200. As shown in FIG. 3, the disc tray 100 includes a recess 120 for receiving a disc 140. The recess 120 defines a recess flange 122. In this embodiment, the disc tray 100 is made of plastic, but it can be made of metal, polymer, glass, or other materials providing similar functions in other embodiments.

As shown in FIG. 2, the housing 200 includes an upper plate 220 parallel to the disc tray 100. In this embodiment, the upper plate 220 is made of metal, but it can be made of plastic, polymer, glass, or other materials providing similar functions in other embodiments. The upper plate 220 includes a barrier portion 300 and a plurality of bending boundaries; the barrier portion 300 is formed by one of the plurality of bending boundaries from the upper plate 220. When the disc 140 cracks inside the disc reading apparatus, the barrier portion 300 prevents the cracked disc from jetting out.

In the embodiment shown in FIG. 2, a plurality of bending boundaries includes a first bending boundary 321 and a second bending boundary 322. The barrier portion 300 is formed by the first bending boundary from the upper plate 220 and is a plate-like structure. However, the number of bending boundaries is not limited to two; it can be a number greater than two. Moreover, in this embodiment, the barrier portion 300 increases the anti-deflection intensity of the upper plate 220 that helps to prevent the upper plate 220 from deformation caused by disc cracking, and thus decreases the probability of the cracked disc's jetting out.

FIG. 3 shows a cross-sectional diagram of the embodiment in FIG. 2. As shown in FIG. 3, the barrier portion 300 includes a second part 420 and a third part 430. The upper plate 220 stretches a first portion 410 out from an end 222 to the first bending boundary 321; the first portion 410 connects to a second portion 420 via the first bending boundary 321. The first portion 410 and the second portion 420 define a first angle 451. In this embodiment, the second portion 420 is a plate-like structure stretching downward from the first portion 410 and is perpendicular to the first portion 410. The first angle 451 is not limited to 90 degrees, however.

The second portion 420 stretches to the second bending boundary 322 and connects to a third portion 430 via the second bending boundary 322; the second portion 420 and the third portion 430 define a second angle 452; and the third portion 430 stretches to a front flange 240. In this embodiment, the third portion 430 is a plate stretching from the second portion 420, parallel to the disc tray 100. The second angle 452 is not limited to 90 degrees, however.

As shown in FIG. 3, the second portion 420 is perpendicular to the disc tray 100. When the disc 140 cracks inside the disc reading apparatus, the second portion 420 obstructs the cracked disc directly to prevent it from jetting out. The angle between the second portion 420 and the disc tray 100 is not limited to 90 degrees, however.

As shown in FIG. 3, a slot 500 exists between the third portion 430 and the disc tray 100. If the cracked disc is not stopped by the second portion 420, it gets into slot 500 and keeps moving out. Then the cracked disc suffers friction provided by the slot. The friction provided by the third portion 430 and the disc tray 100 gradually stops the cracked disc from moving out. The kinetic energy of the cracked disc is reduced so that the faceplate 700 and cover 720 can easily stop the jetting out of the cracked disc.

Figure 4:
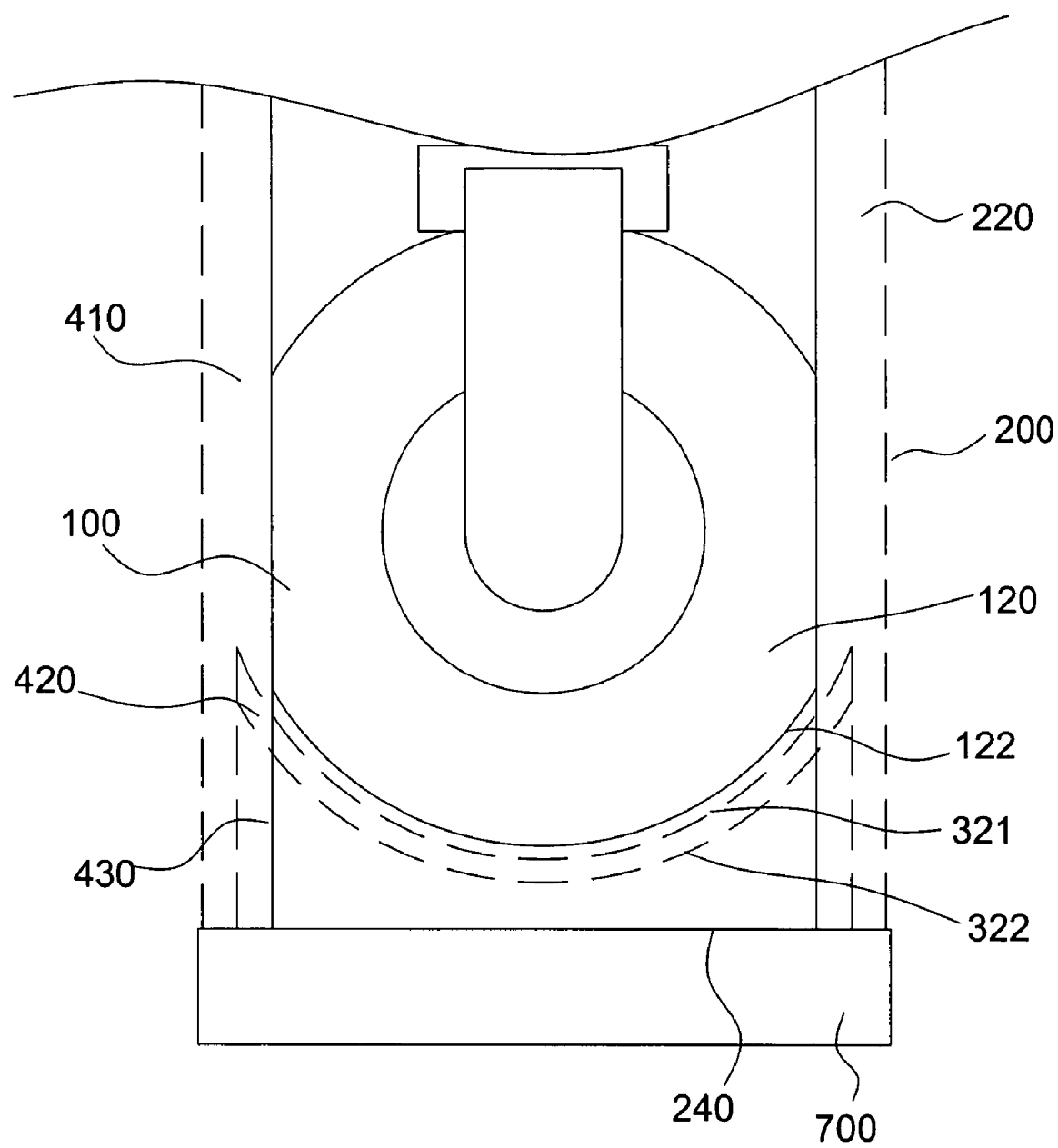
FIG. 4 is a top view of the embodiment in FIG. 2.

FIG. 4 is a top view of the embodiment shown in FIG. 2. In this embodiment, the first bending boundary 321 is located between the recess flange 122 and the front flange 240. When the cracked disc departs from the recess 120 that contains the disc 140, the second portion 420 stops the moving cracked disc. The second portion 420 can thus obstruct the cracked disc more efficiently.

In a preferred embodiment, the first bending boundary 321 is in the form of a partial-cylinder, and the projection of the first bending boundary 321 on the disc tray 100 is concentric with the recess 120. Besides, the second bending boundary 322 is in the form of a flat plate, and the projection of the second bending boundary 322 on the disc tray 100 is concentric with the recess 120. In this way, the distance from the second portion 420 to the recess flange 122 maintains unchanged, and the projective area of the third portion 430 is increased so that the slot 500 can provide stronger friction.

THE SECOND EMBODIMENT

Figure 5A:
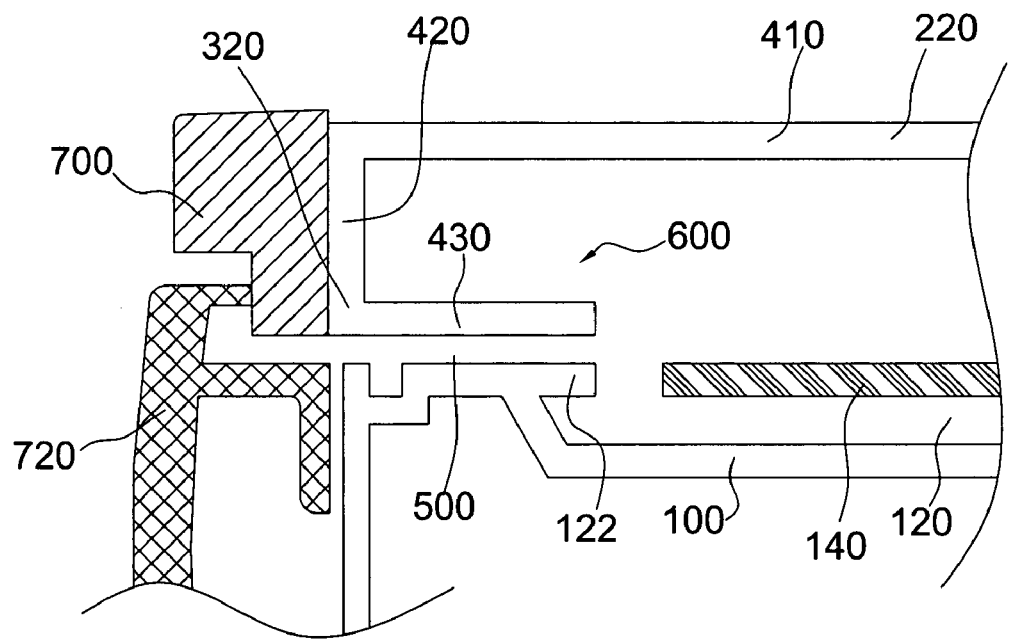
FIG. 5a is a cross-sectional diagram of a disc reading apparatus of the second embodiment of the present invention.

FIG. 5a is a cross-sectional diagram of the disc reading apparatus of the second embodiment of the present invention. The difference between the first and the second embodiment lies in that the second portion 420 stretches downward to the bending part 320 from the flange of the upper plate 220, and that the third portion 430 stretches to the recess flange 122 from bending boundary 320 toward the counter direction of the faceplate 700. In a preferred embodiment, the second portion 420 is perpendicular to the upper plate 220 and the third portion 430. However, the angle between the second portion 420 and the upper plate, or between the second portion 420 and the third portion 430, is not limited to 90 degrees.

As shown in FIG. 5a, the barrier portion 600 is primarily constituted of the third portion 430. A slot 500 exists between the third portion 430 and the disc tray 100. When the disc 140 cracks and is going to jet out, the cracked disc gets into slot 500 to keep moving out. Then the cracked disc suffers friction provided by the slot. Because of the function provided by the third portion 430 and the disc tray 100, the cracked disc is stopped from moving out. The kinetic energy of the cracked disc is reduced so that the faceplate 700 and cover 720 could easily stop the cracked disc from jetting out.

THE THIRD EMBODIMENT

Figure 5B:
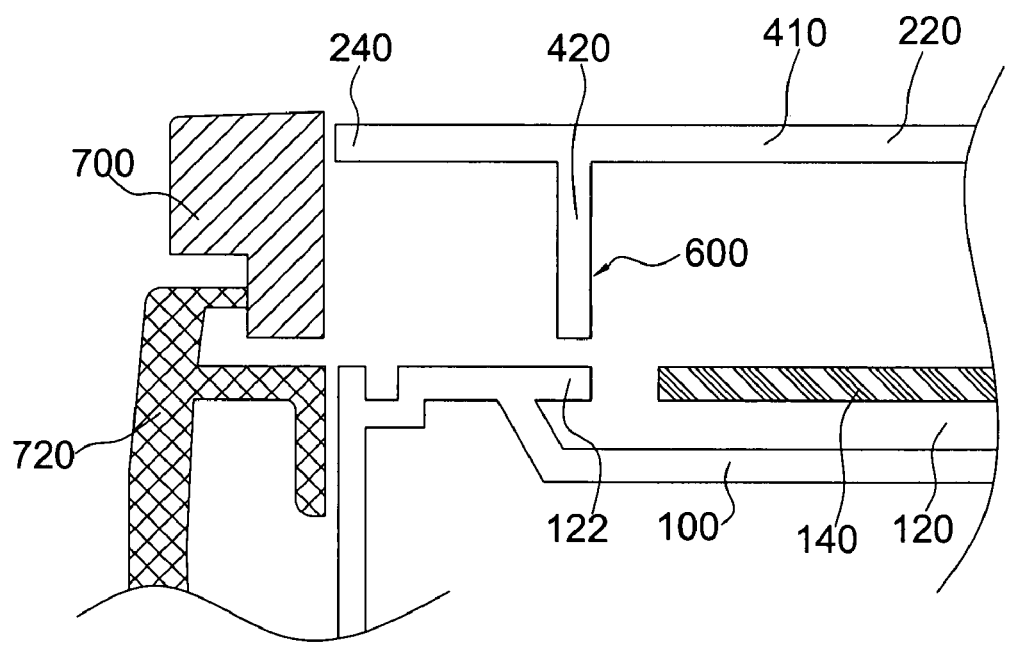
FIG. 5b is a cross-sectional diagram of a disc reading apparatus of the third embodiment of the present invention.

FIG. 5b is a cross-sectional diagram of a disc reading apparatus of the third embodiment of the present invention. The main difference between the first and the third embodiment lies in that the barrier portion 600 is only constituted of the third portion 430. Besides, the second portion 420 does not stretch downward from the flange of the upper plate 220 but from the projection between the recess flange 122 of the upper plate 220 and the front flange 240. In a preferred embodiment, the second portion 420 is a plate-like structure. However, in other embodiments, the second portion 420 can be a block structure, a network structure, or others providing similar functions.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

We claim:

1. A disc reading apparatus, comprising:
   a disc tray including a first portion and a second portion, the first portion being formed with a recess for receiving a disc, the recess defining a recess flange, the second portion being in a form of an extension plate; and
   a housing defining an inner space and including an upper plate parallel to the disc tray, the upper plate including a barrier portion, the barrier portion including a plurality of bending boundaries, the plurality of bending boundaries being disposed above the disc tray, at least one of the plurality boundaries being in a form of a flat plate, the flat plate being in the inner space and substantially parallel and directly opposite to the extension plate, a slot being defined by the flat plate and the extension plate and formed in the inner space and between the flat plate and the extension plate;
   wherein, the plurality of bending boundaries of the barrier portion prevent a cracked disc from jetting out and if the cracked disc moves into the slot, then a friction force provided by the surfaces of the flat plate and the extension plate stops the cracked disc.

2. The disc reading apparatus of claim 1, wherein the barrier portion increases the strength of the upper plate to avoid cracked discs being jetted out due to the upper plate deformation.

3. The disc reading apparatus of claim 1, wherein the plurality of bending boundaries includes a first bending boundary and a second bending boundary.

4. The disc reading apparatus of claim 3, wherein of the first bending boundary is located between the recess flange and the front flange.

5. The disc reading apparatus of claim 3, wherein the first bending boundary is in a form of a partial-cylinder.

6. A disc reading apparatus, comprising:
a disc tray including a first portion and a second portion, the first portion being formed with a recess for receiving a disc, the recess defining a recess flange, the second portion being in a form of an extension plate; and
a housing including an upper plate parallel to the disc tray and a front flange, the upper plate including a barrier portion and a housing flange, a projection of the barrier portion on the disc tray is between the recess flange and a projection of the housing flange on the disc tray, the barrier portion being disposed above the disc tray, the barrier portion including a second bending boundary in a form of a flat plate, the flat plate being substantially parallel and directly opposite to the extension plate, a slot being defined by the flat plate and the extension plate and formed in the inner space and between the flat plate and the extension plate;
wherein, a slot exists between the flat plate and the disc tray, and the barrier portion prevents a cracked disc from jetting out, and if the cracked disc moves into the slot, then a friction force provided by the surfaces of the flat plate and the extension plate stops the cracked disc.

7. The disc reading apparatus of claim 6, wherein the barrier portion is a plate stretching downward from the upper plate.

8. The disc reading apparatus of claim 6, wherein the barrier portion further includes a first bending boundary.

9. The disc reading apparatus of claim 8, wherein the first bending boundary is located between the recess flange and the front flange.

10. The disc reading apparatus of claim 8, wherein the first bending boundary is in a form of a partial-cylinder.

11. The disc reading apparatus of claim 1, wherein the housing and the barrier portion are integrally formed in one piece.

12. The disc reading apparatus of claim 6, wherein the housing and the barrier portion are integrally formed in one piece.

* * * * *